United States Patent
Lumetta

(10) Patent No.: US 9,368,882 B2
(45) Date of Patent: Jun. 14, 2016

(54) ELECTRICAL DEVICE WITH A BUSBAR ASSEMBLY HAVING A FRAME PROVIDING ACCESS FOR LASER WELDING

(71) Applicant: Yazaki North America, Inc., Canton, MI (US)

(72) Inventor: Jeffrey Lumetta, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 14/532,733

(22) Filed: Nov. 4, 2014

(65) Prior Publication Data

US 2015/0136438 A1    May 21, 2015

Related U.S. Application Data

(60) Provisional application No. 61/904,644, filed on Nov. 15, 2013.

(51) Int. Cl.
| | |
|---|---|
| *H02G 5/04* | (2006.01) |
| *H01R 4/02* | (2006.01) |
| *H01M 2/20* | (2006.01) |
| *H01R 43/02* | (2006.01) |
| *H01M 2/22* | (2006.01) |

(52) U.S. Cl.
CPC ............. *H01R 4/029* (2013.01); *H01M 2/202* (2013.01); *H01R 43/0221* (2013.01); *H02G 5/04* (2013.01); *H01M 2/22* (2013.01)

(58) Field of Classification Search
USPC ............. 174/88 B, 99 B, 70 B; 439/212
See application file for complete search history.

(56) References Cited

U.S. PATENT DOCUMENTS

| | | | |
|---|---|---|---|
| 5,951,890 A | 9/1999 | Beuch et al. | |
| 6,133,544 A | 10/2000 | Beuch et al. | |
| 6,274,844 B1 | 8/2001 | Beuch et al. | |
| 7,952,026 B2 * | 5/2011 | Ramsey .................. | H02G 5/08 174/129 B |

(Continued)

FOREIGN PATENT DOCUMENTS

| | | |
|---|---|---|
| JP | H06-223803 A | 8/1994 |
| JP | H07-235287 A | 9/1995 |
| JP | 2006-147394 A | 6/2006 |

OTHER PUBLICATIONS

European Patent Office Search Report Dated Apr. 17, 2015 for European Application No. 14192828.

(Continued)

*Primary Examiner* — Dhirubhai R Patel
(74) *Attorney, Agent, or Firm* — Harness, Dickey & Pierce, P.L.C.

(57) ABSTRACT

An electrical device having an electrical component, which has an electric terminal, and a busbar assembly having a busbar and a frame. The busbar is formed of a strip of conductive material and has first and second busbar sides that are opposite from one another. The frame has a busbar seat and a cover member. The busbar seat extends through a first frame side of the frame. The busbar is received into the busbar seat and seated to the frame such that the first busbar side is spaced apart from the first frame side so that the busbar is contained wholly within the frame. The cover member abuts the second busbar side and defines an irradiation aperture that is configured to receive a laser beam from a laser welder therethrough. A laser weld fuses the busbar to the electric terminal.

19 Claims, 3 Drawing Sheets

(56) References Cited

U.S. PATENT DOCUMENTS

| | | | |
|---|---|---|---|
| 8,173,899 B2 * | 5/2012 | Doring | H02G 5/02 174/129 B |
| 2011/0311861 A1 | 12/2011 | Baek et al. | |
| 2012/0088143 A1 | 4/2012 | Lietz et al. | |

OTHER PUBLICATIONS

Office Action issued by the Japanese Patent Office on Oct. 27, 2015 for Japanese Patent Application No. 2014-231228. Translation provided by Marks & Clerk Singapore LLP.

* cited by examiner ly conductive material and may include a recess defined by a busbar seat. The recess may extend into a first frame side of the frame opposite a second frame side of the frame. The busbar may be received into the recess and seated against the busbar seat such that the first busbar side is spaced apart from the first frame side so that the busbar is disposed entirely between the first and second frame sides. The first busbar side contacts the electric terminals. The frame may define a plurality of irradiation apertures that extend through the second frame side and into the recess. Each of the irradiation apertures may be positioned at least partially in-line with a corresponding one of the electric terminals. The irradiation apertures may be configured to restrict contact between the busbar and foreign objects while allowing a laser beam from a laser welder to pass therethrough.

ELECTRICAL DEVICE WITH A BUSBAR ASSEMBLY HAVING A FRAME PROVIDING ACCESS FOR LASER WELDING

CROSS-REFERENCE TO RELATED APPLICATIONS

This application claims the benefit of U.S. Provisional Application No. 61/904,644, filed on Nov. 15, 2013. The entire disclosure of the above application is incorporated herein by reference.

FIELD

The present disclosure relates to an electrical device with a busbar assembly having a frame that provides access for laser welding.

BACKGROUND

This section provides background information related to the present disclosure and is not necessarily prior art.

Various electrical devices employ a busbar for interconnecting electric components, such as connecting the terminals to a source of electrical power. The busbars are made of a conductive metal and are often times perforated to reduce the mass and cost of the busbar. Conventionally, a frame is used about the outer perimeter of a perforated busbar. The frame provides a means by which the busbar may be lifted (e.g., by the fingers of an assembly technician) without directly contacting the busbar. There are several drawbacks associated with this configuration.

For example, because the frame extends only about the perimeter of the busbar, it is still possible for the surface of the busbar to contact another object, such as the finger of an assembly technician or an abrasive or dirty surface. Furthermore, such frames are not sufficiently strong to prevent undesired bending of the busbar. Additionally, coupling the busbar assembly (i.e., the busbar and the frame) typically entails the use of a threaded fastener.

In view of the above remarks, there remains a need in the art for an electrical device having an improved busbar assembly.

SUMMARY

This section provides a general summary of the disclosure, and is not a comprehensive disclosure of its full scope or all of its features.

In one form, the present disclosure provides an assembly that may include an electrical component and a busbar assembly. The electrical component includes an electric terminal. The busbar assembly includes a busbar and a frame. The busbar is formed of a strip of conductive material and includes first and second busbar sides that are opposite from one another. The frame may include a busbar seat and a cover member. The busbar seat may extend through a first frame side of the frame. The busbar may be received into the busbar seat and seated to the frame such that the first busbar side is spaced apart from the first frame side so that the busbar is contained wholly within the frame. The cover member may abut the second busbar side and define an irradiation aperture that is configured to receive a laser beam from a laser welder therethrough.

In some configurations, the irradiation aperture is at least partially in-line with the electric terminal.

In some configurations, the busbar seat defines a recess receiving the busbar.

In some configurations, the busbar engages the frame by a press fit.

In some configurations, the assembly includes a jig configured to clamp the busbar assembly against the electrical component.

In some configurations, the jig includes an aperture that is in-line with the irradiation aperture in the cover member.

In some configurations, the jig includes at least another aperture, the cover member includes at least another irradiation aperture, and the electrical component includes at least another electric terminal. Each of the irradiation apertures may be positioned in-line with a corresponding one of the electric terminals. Each of the apertures in the jig may be positioned in-line with a corresponding one of the irradiation apertures in the cover member.

In some configurations, the apertures in the jig are tapered such that the apertures include a first diameter at a first location proximate the frame and a second diameter at a second location distal to the frame.

In some configurations, the second diameter is larger than the first diameter.

In some configurations, the frame is formed from a non-conductive material.

In another form, the present disclosure provides an assembly that may include an electrical component and a busbar assembly. The electrical component may include a plurality of electric terminals. The busbar assembly may include a busbar and a frame. The busbar is formed from an electrically conductive material and includes first and second busbar sides that are opposite from one another. The frame is formed of a non-electrically conductive material and may include a recess defined by a busbar seat. The recess may extend into a first frame side of the frame opposite a second frame side of the frame. The busbar may be received into the recess and seated against the busbar seat such that the first busbar side is spaced apart from the first frame side so that the busbar is disposed entirely between the first and second frame sides. The first busbar side contacts the electric terminals. The frame may define a plurality of irradiation apertures that extend through the second frame side and into the recess. Each of the irradiation apertures may be positioned at least partially in-line with a corresponding one of the electric terminals. The irradiation apertures may be configured to restrict contact between the busbar and foreign objects while allowing a laser beam from a laser welder to pass therethrough.

In some configurations, the assembly includes a jig including a plurality of apertures positioned in-line with a corresponding one of the irradiation apertures in the frame.

In some configurations, the apertures in the jig are tapered such that each of the apertures includes a first diameter at a first location proximate the frame and a second diameter at a second location distal to the frame, the second diameter being larger than the first diameter.

In another form, the present disclosure provides a method that may include providing an electrical component having a plurality of electric terminals, and inserting a busbar into a recess of a busbar frame such that the entire busbar is disposed between opposing first and second sides of the busbar frame, the recess extending into the first side of the busbar frame. The busbar frame may include a plurality of irradiation apertures extending through the second side and into the recess. The method may also include fixing the busbar relative to a busbar seat defining the recess; positioning the busbar in contact with the electric terminals such that each of the irradiation apertures in the busbar frame is at least partially in-line with a corresponding one of the electric terminals; and fixedly attaching the busbar to the electric terminals in a manner that facilitates electrical communication therebetween.

In some configurations, the method includes positioning a jig in contact with the second side of the busbar frame.

In some configurations, the jig includes a plurality of apertures. Positioning the jig may include at least partially aligning each aperture in-line with a corresponding one of the irradiation apertures in the frame.

In some configurations, fixedly attaching the busbar to the electric terminals includes laser welding the busbar to the electric terminals.

In some configurations, laser welding the busbar to the electric terminals includes directing each of a plurality of laser beams through a corresponding one of the irradiation apertures in the busbar frame.

In some configurations, laser welding the busbar to the electric terminals includes directing each of the plurality of laser beams through a corresponding one of the apertures in the jig.

In some configurations, the method includes using the jig to apply a force to the frame that drives the busbar toward the electrical terminals when energy from the laser beams starts to melt at least one of the busbar and the electrical terminals.

In some configurations, the method includes removing the jig from the frame after the busbar has been fused to the electric terminals.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
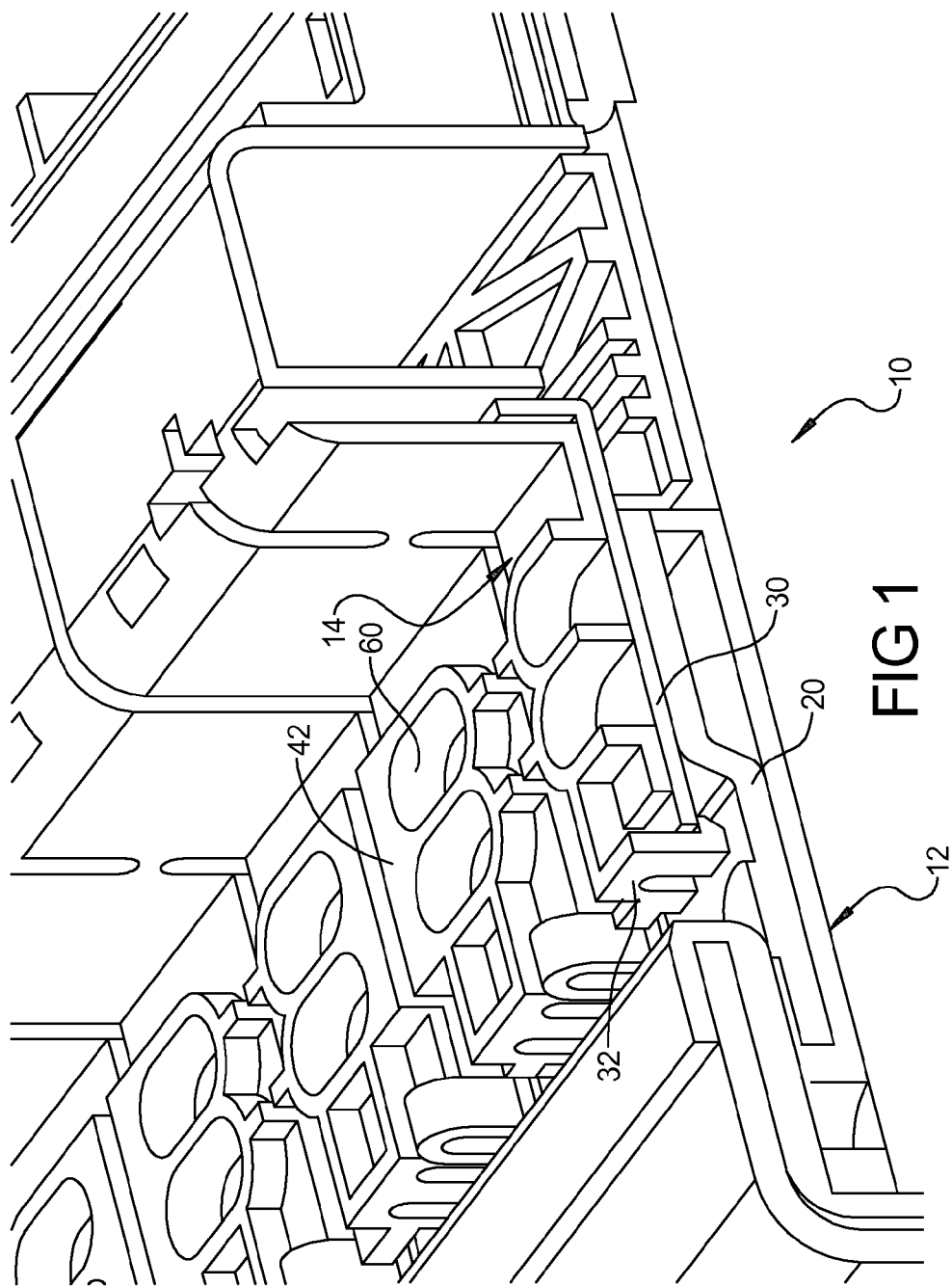
FIG. 1 is a perspective view of an exemplary electrical device having a busbar assembly constructed in accordance with the teachings of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1 of the drawings, an exemplary electrical device is generally indicated by reference numeral 10. The electrical device 10 can include one or more electrical components 12 and a busbar assembly 14. The electrical components 12 are conventional and need not be described in significant detail herein, other than to note that each electrical component 12 has one or more electric terminals 20 that is formed of a conductive material. In the particular example provided, each of the electrical components 12 is a battery cell having an electric terminal 20. It will be appreciated, however, that the electrical components 12 could be selected from any type of electrical component, including fuses, relays, and capacitors. As such, it will be understood that the disclosure of battery cells does not limit the scope of the present disclosure to electrical devices having one or more battery cells.

Figure 2:
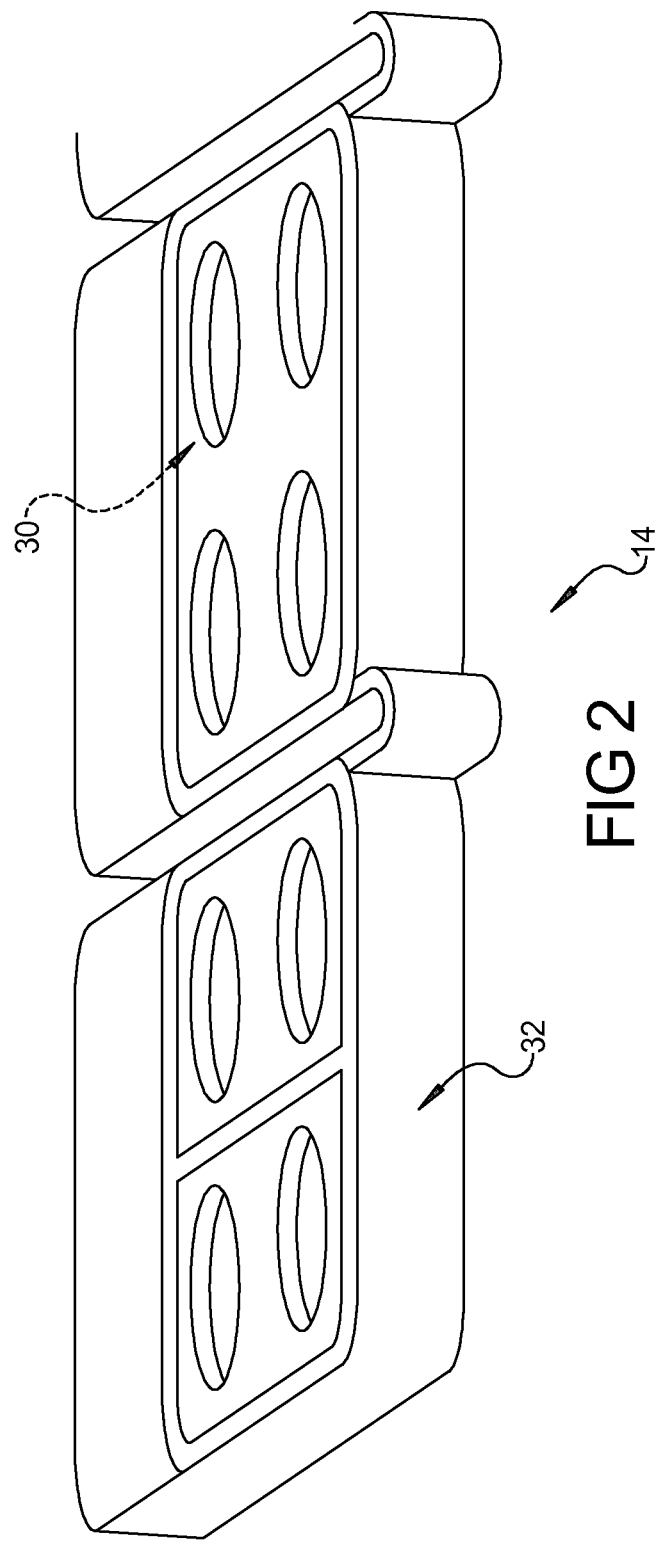
FIG. 2 is a perspective view of a portion of the electrical device of FIG. 1, illustrating the busbar assembly in more detail.
Figure 3:
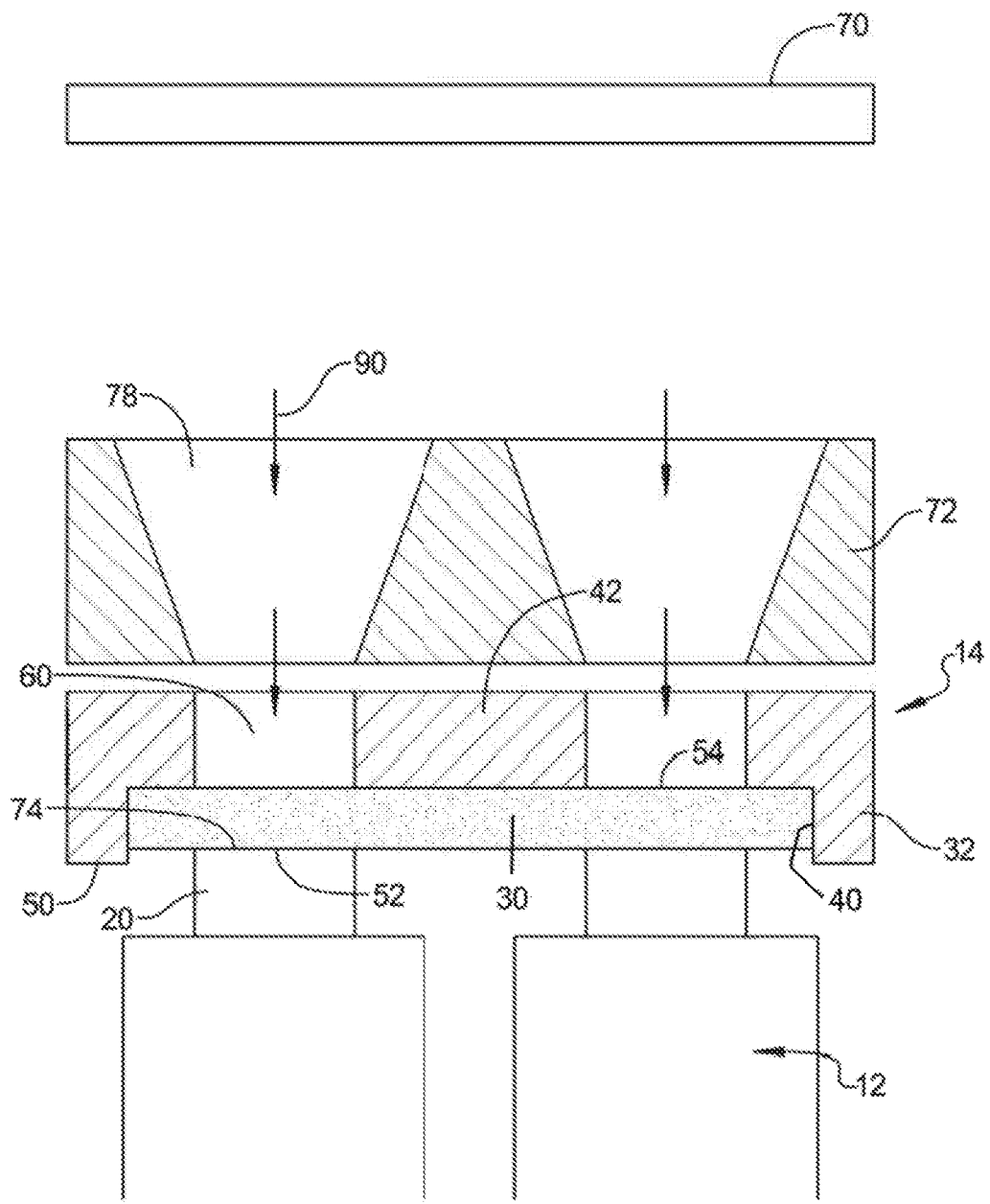
FIG. 3 is a section view depicting a laser welder and jig used to laser weld the busbar assembly to a terminal of an electrical component.

With reference to FIGS. 2 and 3, the busbar assembly 14 can include a busbar 30 and a frame 32. The busbar 30 can be formed of a conductive material that is compatible with the conductive material of the electric terminals 20 of the electrical component 12. In the example provided, both the electrical terminals 20 and the busbars 30 are formed of aluminum. The busbar 30 can be a solid, non-perforated piece of strip material.

The frame 32 can be an injection-molded non-conductive plastic component that can include a busbar seat 40 (e.g., a recess) and a cover member 42. The busbar seat 40 is configured to receive the busbar 30 therein. The busbar seat 40 can be recessed into the frame 32 such that a first side 50 of the frame 32 extends past a first side 52 of the busbar 30. Stated another way, the busbar 30 is contained wholly within the frame 32 when the busbar 30 is received into the busbar seat 40. Configuration in this manner can reduce the risk that the first side 52 of the busbar 30 is undesirably contacted when the busbar assembly 14 is resting on the first side 50 of the frame 32. The busbar seat 40 can be configured to receive the busbar 30 in a press-fit manner. Alternatively, one or more locking tabs (not shown) can be formed into the frame 32 and can engage the busbar 30 in a snap-fit manner. Additionally or alternatively, an adhesive (not shown) could be employed to secure the busbar 30 to the frame 32. The busbar seat 40 can terminate at the cover member 42, which can partly shroud a second, opposite side 54 of the busbar 30. The cover member 42 can define one or more first irradiation apertures 60 that provide access through the cover member 42 to the second side 54 of the busbar 30. It will be appreciated that the cover member 42 can shroud the busbar 30 to prevent undesired contact between the second side 54 of the busbar 30 and another object. The thickness of the cover member 42—or parts thereof, such the raised portion that surrounds the first irradiation apertures 60—renders it difficult or impossible for a portion of the finger of an assembly technician to be inserted into one of the first irradiation apertures 60 and make contact with the second side 54 of the busbar 30.

With specific reference to FIG. 3, a laser welder 70 can be employed to weld each of the busbars 30 to an associated one of the electric terminals 20. A jig 72 can be employed to clamp the busbar assembly 14 to the electric component 12 such that the first side 52 of the busbar 30 abuts a side 74 of the electric terminal 20. The jig 72 can be abutted directly against the cover member 42 of the frame 32 and can define one or more second irradiation apertures 78 that permit the laser welder 70 to access the busbar 30. In the example provided, the quantity of the second irradiation apertures 78 is equal to the quantity of first irradiation apertures 60 and each of the second irradiation apertures 78 is disposed in-line with a corresponding one of the first irradiation apertures 60. The laser welder 70 can be operated to generate one or more laser beams 90 that are transmitted through the second and first irradiation apertures 78 and 60 to heat the busbar 30 to a point where the busbar 30 fuses to the electric terminal 20. It will be appreciated that the jig 72 can apply a force to the busbar assembly 14 that drives the busbar assembly 14 toward the electrical terminal 20 when energy from the laser beam(s) 90 starts to melt one or both of the busbar (30) and the electrical terminal 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly comprising:
an electrical component having an electric terminal; and
a busbar assembly having a busbar and a frame, the busbar being formed of a strip of conductive material and having first and second busbar sides that are opposite from one another, the frame having a recess and a cover member, the recess extending through a first frame side of the frame, the busbar being received into the recess and seated within the recess such that the first busbar side is spaced apart from the first frame side so that the busbar is contained wholly within the frame, the cover member abutting the second busbar side and defining an irradiation aperture that is configured to receive a laser beam from a laser welder therethrough, the electric terminal extending through the first frame side and into the recess to contact the busbar.

2. The assembly of claim 1, wherein the irradiation aperture is at least partially in-line with the electric terminal.

3. The assembly of claim 1, further comprising a jig configured to clamp the busbar assembly against the electrical component.

4. The assembly of claim 3, wherein the jig includes an aperture that is in-line with the irradiation aperture in the cover member.

5. The assembly of claim 4, wherein the jig includes at least another aperture, the cover member includes at least another irradiation aperture, and the electrical component includes at least another electric terminal, each of the irradiation apertures are positioned in-line with a corresponding one of the electric terminals, and each of the apertures in the jig are positioned in-line with a corresponding one of the irradiation apertures in the cover member.

6. The assembly of claim 5, wherein the apertures in the jig are tapered such that the apertures include a first diameter at a first location proximate the frame and a second diameter at a second location distal to the frame.

7. The assembly of claim 6, wherein the second diameter is larger than the first diameter.

8. The assembly of claim 1, wherein the frame is formed from a non-conductive material.

9. An assembly comprising:
an electrical component having a plurality of electric terminals; and
a busbar assembly having a busbar and a frame, the busbar being formed from an electrically conductive material and having first and second busbar sides that are opposite from one another, the frame being formed from a non-electrically conductive material and having a recess, the recess extending into a first frame side of the frame opposite a second frame side of the frame, the busbar being received into the recess such that the first busbar side is spaced apart from the first frame side so that the busbar is disposed entirely between the first and second frame sides, the first busbar side contacting the electric terminals, the frame defining a plurality of irradiation apertures that extend through the second frame side and into the recess, each of the irradiation apertures is positioned at least partially in-line with a corresponding one of the electric terminals, the irradiation apertures configured to restrict contact between the busbar and foreign objects while allowing a laser beam from a laser welder to pass therethrough, the electric terminals extending through the first frame side and into the recess to contact the busbar.

10. The assembly of claim 9, further comprising a jig including a plurality of apertures positioned in-line with a corresponding one of the irradiation apertures in the frame.

11. The assembly of claim 10, wherein the apertures in the jig are tapered such that each of the apertures includes a first diameter at a first location proximate the frame and a second diameter at a second location distal to the frame, the second diameter being larger than the first diameter.

12. A method comprising:
providing an electrical component having a plurality of electric terminals;
inserting a busbar into a recess of a busbar frame such that the entire busbar is disposed between opposing first and second sides of the busbar frame, the recess extending into the first side of the busbar frame, the busbar frame including a plurality of irradiation apertures extending through the second side and into the recess;
fixing the busbar within the recess;
positioning the busbar in contact with the electric terminals such that the electric terminals extend through the first frame side and into the recess to contact the busbar and such that each of the irradiation apertures in the busbar frame is at least partially in-line with a corresponding one of the electric terminals; and
fixedly attaching the busbar to the electric terminals in a manner that facilitates electrical communication therebetween.

13. The method of claim 12, further comprising positioning a jig in contact with the second side of the busbar frame.

14. The method of claim 13, wherein the jig includes a plurality of apertures, and wherein positioning the jig includes at least partially aligning each aperture in-line with a corresponding one of the irradiation apertures in the frame.

15. The method of claim 14, wherein fixedly attaching the busbar to the electric terminals includes laser welding the busbar to the electric terminals.

16. The method of claim 15, wherein laser welding the busbar to the electric terminals includes directing each of a plurality of laser beams through a corresponding one of the irradiation apertures in the busbar frame.

17. The method of claim 16, wherein laser welding the busbar to the electric terminals includes directing each of the plurality of laser beams through a corresponding one of the apertures in the jig.

18. The method of claim 17, further comprising using the jig to apply a force to the frame that drives the busbar toward the electrical terminals when energy from the laser beams starts to melt at least one of the busbar and the electrical terminals.

19. The method of claim 18, further comprising removing the jig from the frame after the busbar has been fused to the electric terminals.

* * * * *